United States Patent
Yoon

(10) Patent No.: US 9,857,523 B2
(45) Date of Patent: Jan. 2, 2018

(54) APPARATUS FOR CONTROLLING LIGHT BEAM PATH

(71) Applicant: Electronics and Telecommunications Research Institute, Daejeon (KR)

(72) Inventor: Min Sung Yoon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 13 days.

(21) Appl. No.: 14/949,631

(22) Filed: Nov. 23, 2015

(65) Prior Publication Data
US 2016/0147000 A1 May 26, 2016

(30) Foreign Application Priority Data

Nov. 24, 2014 (KR) .................. 10-2014-0164602
Sep. 16, 2015 (KR) .................. 10-2015-0131104

(51) Int. Cl.
*F21V 8/00* (2006.01)
(52) U.S. Cl.
CPC ........... *G02B 6/005* (2013.01); *G02B 6/0026* (2013.01); *G02B 6/0028* (2013.01)
(58) Field of Classification Search
CPC .... G02B 6/005; G02B 6/0028; G02B 6/0026; G02B 6/0075–6/0076; G02B 6/0078
See application file for complete search history.

(56) References Cited

U.S. PATENT DOCUMENTS

| 5,521,725 | A  | * | 5/1996  | Beeson ..................... F21V 5/02 349/61 |
| 7,792,401 | B2 |   | 9/2010  | Kang et al. |
| 2011/0211365 | A1 | * | 9/2011  | Park ..................... G02B 6/0046 362/606 |
| 2014/0160543 | A1 |   | 6/2014  | Putilin et al. |
| 2014/0347333 | A1 |   | 11/2014 | Lee et al. |
| 2016/0259117 | A1 | * | 9/2016  | Wang ................. G02F 1/133615 |
| 2016/0266304 | A1 | * | 9/2016  | Teng .................... G02B 6/0076 |

FOREIGN PATENT DOCUMENTS

WO  0231405 A2  4/2002

* cited by examiner

*Primary Examiner* — Joseph L Williams
*Assistant Examiner* — Jose M Diaz
(74) *Attorney, Agent, or Firm* — William Park & Associates Ltd.

(57) ABSTRACT

The present invention relates to an apparatus for controlling a light beam path.
Specifically, the apparatus for controlling the light beam path outputs light beams with a uniform intensity expanded corresponding to a size of an active area of a display by using characteristics of an incident wave field of light beams having coherence.

18 Claims, 7 Drawing Sheets

APPARATUS FOR CONTROLLING LIGHT BEAM PATH

CROSS-REFERENCE TO RELATED APPLICATION

This application claims the priority benefit of Korean Patent Application No. 10-2014-0164602, filed on Nov. 24, 2014, No. 10-2015-0131104, filed on Sep. 16, 2015, in the Korean Intellectual Property Office, the disclosures of which are incorporated herein by reference.

BACKGROUND

1. Field of the Invention

Embodiments relate to an apparatus for controlling a light beam path, and more particularly, to an apparatus for controlling a light beam path which controls a light beam path for a lighting device installed in a display apparatus.

2. Description of the Related Art

Holographic display reconstructs a stereoscopic object in space, which is an ideal fully three-dimensional (3D) display technology. Specifically, holographic display reproduces wavefronts caused by an object as they are to provide an effect as if the object were actually present in front of one's eyes. Conventional holographic display creates left-eye and right-eye images which are different on eye movements and thus causes eye strain and dizziness due to parallax.

Development of 3D display in recent years allows reproduction of an object with accurate parallax and depth to avoid eye strain and dizziness due to accommodation-convergence inconsistency. Further, holographic display has evolved into an ultimate 3D display technology which enables different images based on viewpoint changes to be viewed and allows a plurality of users to watch images without additional devices (for example, glasses). However, there is a plurality of requirements to realize holographic display.

First, holographic display needs a display device for reproducing an image with a wide viewing angle. That is, holographic display is to reconstruct an image with a wide viewing angle, which involves a display device with a pixel pitch of about visible ray wavelength (1 μm or less).

Second, holographic display requires a display area with at least a certain size for reproducing a holographic image. That is, holographic display reproduces a holographic image with a sufficient size based on an image. Thus, a display area of a spatial light modulator is required to have an active area with at least a certain size (at least 2 inches). To this end, a technique for expanding a panel size for holography by tiling a small panel has been introduced recently.

However, in a tiling structure, joint boundary lines cause black lines in a reproduced hologram, thus worsening quality of the reproduced hologram. In addition, commercially available display devices can currently reconstruct holographic images with very limited ranges of sizes and viewing angles, making it difficult to actually observe characteristics (motion parallax, accommodation-convergence consistency, and binocular parallax) of holographic display as ideal 3D display.

Thus, extensive studies are being conducted to overcome the foregoing limitations by combining display devices with additional optical and mechanical control systems. However, such systems occupy a large space and involve an optically precise alignment process. Even though a holographic display system is actually realized, a bulky system structure thereof is a serious disadvantage of not being easy to move. Further, holographic display mostly uses an illumination light source having coherence, such as a laser. Here, since it is dangerous to expose eyes directly to an illumination light for a long time, indirectly observing and viewing images generally captured with a camera may be needed to provide optimal images.

Therefore, coherent light with a sufficient intensity need to be emitted at a uniform intensity to an active area of a spatial light modulator which encodes a hologram. Furthermore, it is necessary to provide a holographic display including a flat illumination device which is as thin and light as possible and includes a display active area in the holographic image reproduction system.

SUMMARY

An embodiment provides a flat light beam path control apparatus which emits light beams having coherence at a uniform intensity to an active area of a display and has a minimum thickness, such as a spatial light modulator.

According to an aspect, there is provided an apparatus for controlling a light beam path, the apparatus including a first light guide plate on which a light beam output from a light source is incident, the light beam being incident on an entrance surface of the first light guide plate at a first incidence angle and being transmitted at a first transmittance angle; a first grating configured to transmit the light beam incident on the first light guide plate into a second light guide plate, the light beam transmitted through the first grating being incident on a grating surface of the first grating at the first incidence angle corresponding to the first transmittance angle and being transmitted into the second light guide plate at a second transmittance angle; the second light guide plate configured to pass the light beam transmitted through the first grating to be incident on a second grating, the light beam passing through the second light guide plate being determined on the second transmittance angle and a refractive index of the second light guide plate; and the second grating on which the light beam passing through the second light guide plate is incident, the light beam incident on the second grating being output in a direction perpendicular to one surface of the second grating.

The incident light beam may be P-polarized to be incident on the entrance surface in consideration of a surface reflectance on the entrance surface of the first light guide plate according to a refractive index of air.

The light beam transmitted through the first grating may be transmitted into the second light guide plate having the same refractive index as a refractive index of the first light guide plate according to a diffraction condition of the first grating.

The first transmittance angle may be determined based on the first incidence angle of the light beam incident on the first light guide plate, a grating direction of the first grating, and a grating period of the first grating.

The first grating may connect the first light guide plate and the second light guide plate which are combined at a slope of the transmittance angle in consideration of a relative refractive index between the first light guide plate and air so that the light beam enters the second light guide plate.

The output light beam may have a width expanded by an incidence wave field of the light beam incident on the entrance surface after transmitted through the first grating as compared with before transmitted through the first grating.

The transmitted light beam may have a width expanded by an incidence wave field of the light beam transmitted into the second light guide plate after transmitted through the second grating as compared with before transmitted through the second grating.

The output light beam may be generated by an incidence wave field having coherence and have a spatially uniform intensity.

The second grating may be connected to one side of the second light guide plate in consideration of an incidence angle of the light beam passing through the second light guide plate so that the light beam exits at an angle perpendicular to a light exit surface of the second grating, the incidence angle of the light beam being determined on the second transmittance angle and the refractive index of the second light guide plate.

A display may be a flat holographic display which is connected in parallel with the light exit surface of the second grating or is separate at a regular interval from the light exit surface of the second grating.

According to an embodiment, there is provided a flat light beam path control apparatus which emits light beams having coherence at a uniform intensity to an area enough to include an active area of a display and has a minimum thickness, such as a spatial light modulator, thereby realizing a single-module flat holographic display system commercially available.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Hereinafter, embodiments of the present invention will be described in detail with reference to the accompanying drawings.

Figure 1:
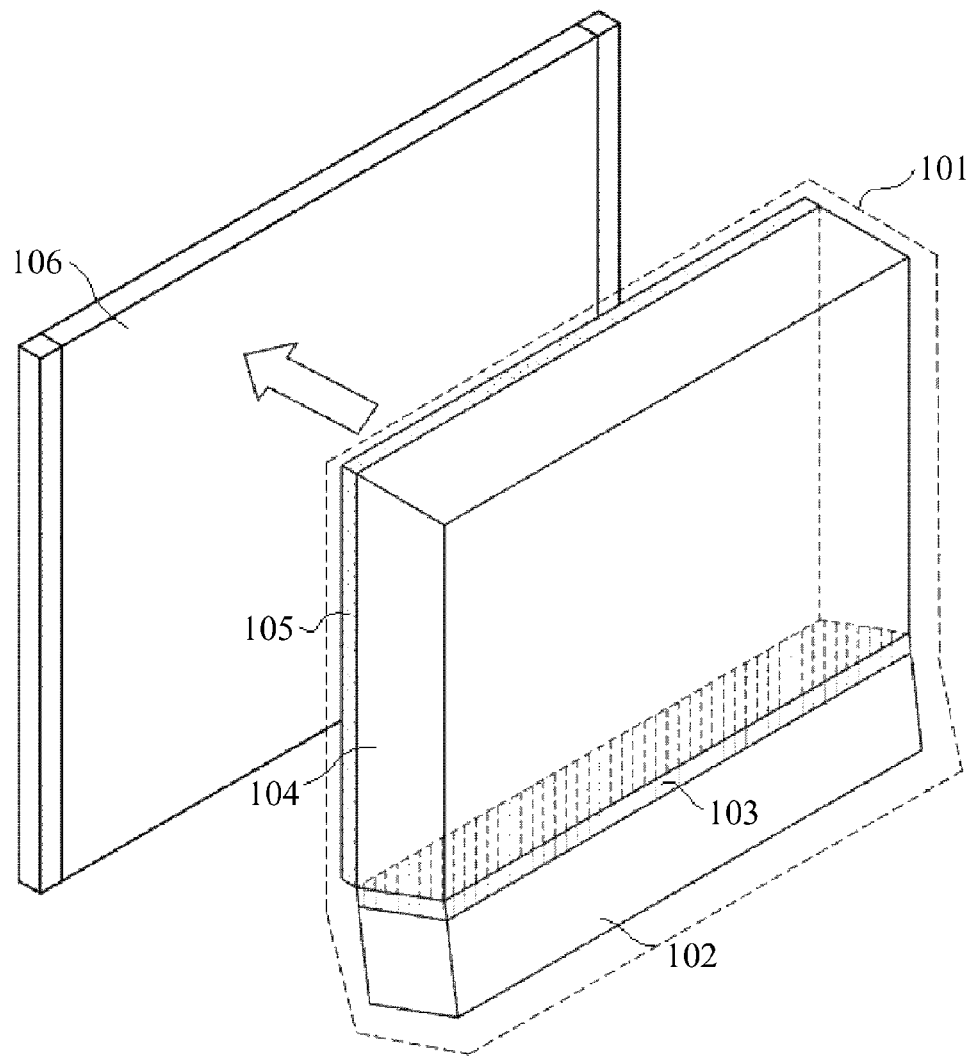
FIG. 1 is a diagram illustrating an apparatus for controlling a light beam path ("light beam path control apparatus") and a display according to an embodiment.

FIG. 1 is a diagram illustrating an apparatus for controlling a light beam path and a display according to an embodiment.

Referring to FIG. 1, the apparatus for controlling the light beam path (also referred to as "light beam path control apparatus") 101 may be a lighting device which is capable of outputting light beams with a uniform intensity expanded corresponding to an active area of the display by using characteristics of an incident wave field of light beams having coherence. For example, the light beam path control apparatus 101 may be a small-sized laser module configured as a slim-style back light unit (BLU) or front light unit (FLU). Also, the light beam path control apparatus 101 may include at least one optical component to control a path of incident light beams. That is, the light beam path control apparatus 101 may control a path of light beams in a direction toward the display 106 and output light beams with an expanded width to the display 106.

The display 106 may modulate the light beams with the uniform intensity output from the light beam path control apparatus 101 to display a stereoscopic image in space. Here, the light beam path control apparatus 101 and the display 106 may be connected in a single module form (not shown) or be separated at a regular interval in a display system (shown).

Specifically, the light beam path control apparatus 101 may control a path of light beams output from a light source in order to output light beams to the display 106. To this end, light beams to be output to the display 106 may be incident on the light beam path control apparatus 101. Here, light beams may be incident on the light beam path control apparatus 101 through the following stages.

In detail, light beams may be output from a light source and pass through a light collector which collects and parallelizes output light beams. Here, the light beams may exhibit characteristics of an incident wave field having coherence. The light beams passing through the light collector has a plane wavefront with a distinguishable directivity and may have a spatially uniform intensity.

Here, the light collector may pass the light beams output from the light source according to a light transmission principle. That is, the light collector may pass light beams P-polarized in order to enhance light beam incidence efficiency in consideration of a surface reflectance on a light beam entrance surface of the light beam path control apparatus 101.

Here, the light beam path control apparatus 101 may include a first light beam expander and a second light beam expander in order to control a path of light beams and expand a width of light beams depending on a position of the display 106. The first light beam expander may include a first light guide plate 102 and a first grating 103, and the second light beam expander may include a second light guide plate 104 and a second grating 105. The first light beam expander and the second light beam expander may be disposed to be in contact with each other and be connected in a single body to have a geometric cross-sectional structure.

The first light beam expander may control a path of light beams output from the light collector so that the light beams may be incident and transmitted into the second light guide plate 104 through the first grating. Here, the light beams transmitted through the first grating may be expanded in width by the incidence wave field and transmitted into the second light guide plate.

The second light beam expander may control the path of the light beams so that the light beams transmitted through the first light beam expander may pass through the second light guide plate 104 and be output through the second grating 105 in a direction perpendicular to the display 106. Here, the light beams transmitted through the second grating 105 may be expanded in width by the incidence wave field and output to the display 106.

Here, the first light beam expander and the second light beam expander may control diffraction conditions of the first grating and the second grating respectively included therein, thereby controlling the path of the transmitted light beams. For example, the first grating and the second grating may be gratings which satisfy a Bragg's diffraction condition with respect to a normal of a grating surface with a pitch of P.

Ultimately, the light beam path control apparatus 101 may control the path of the light beams in the direction toward the display 106 according to the diffraction conditions of the gratings included in the first light beam expander and the second light beam expander. Further, as the width of the light beams is expanded by the incidence wave field of the light beams while passing through the first grating 103 and the second grating 105, the light beam path control apparatus 101 may expand the incidence wave field of the light beams corresponding to the size of the active area of the display 106.

The display 106 may receive the light beams expanded corresponding to the size of the active area through the light beam path control apparatus 101 to display a stereoscopic image.

Figure 2A:
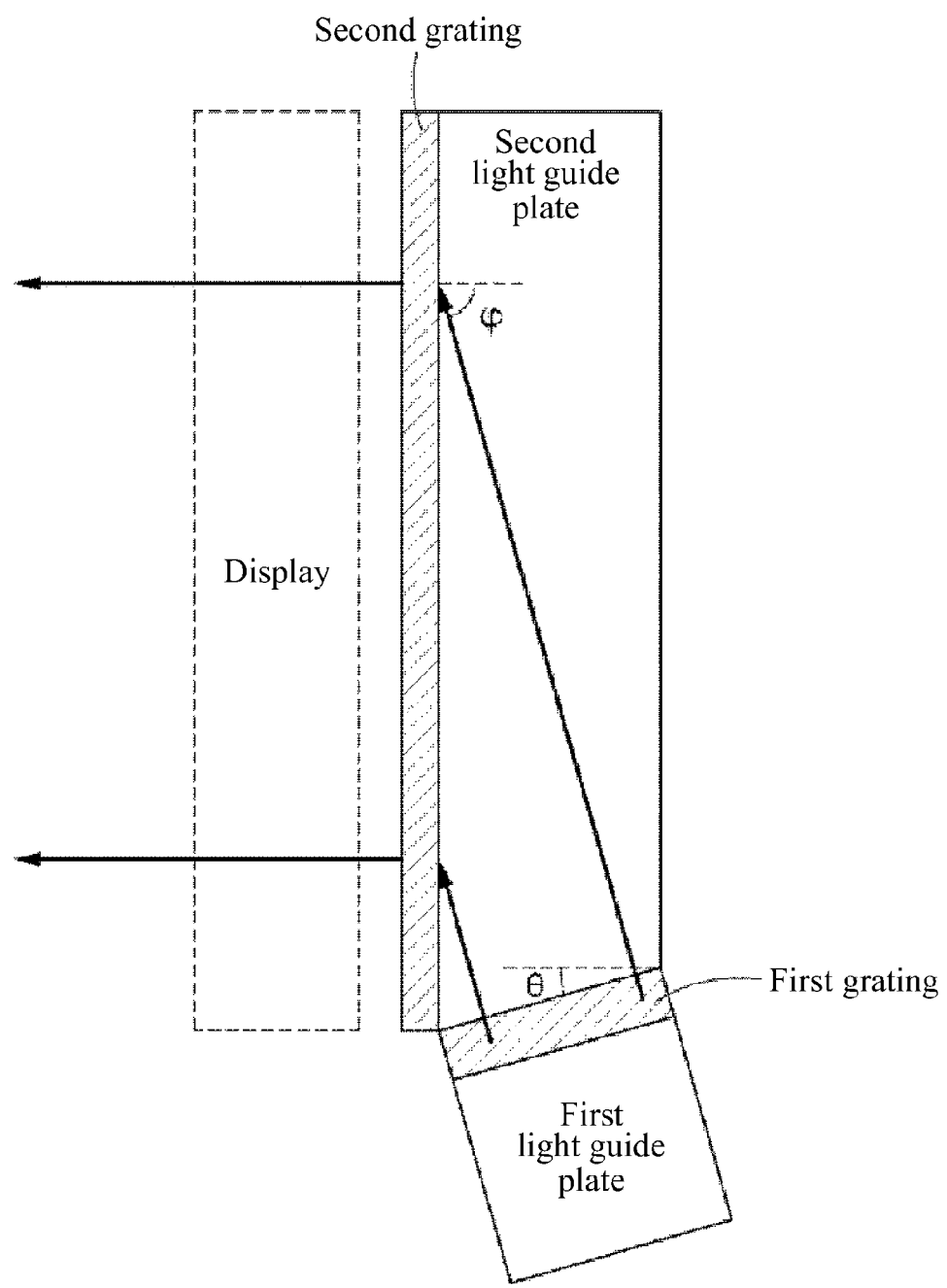
FIGS. 2A and 2B are a side view and front view of a light beam path control apparatus according to an embodiment.
Figure 2B:
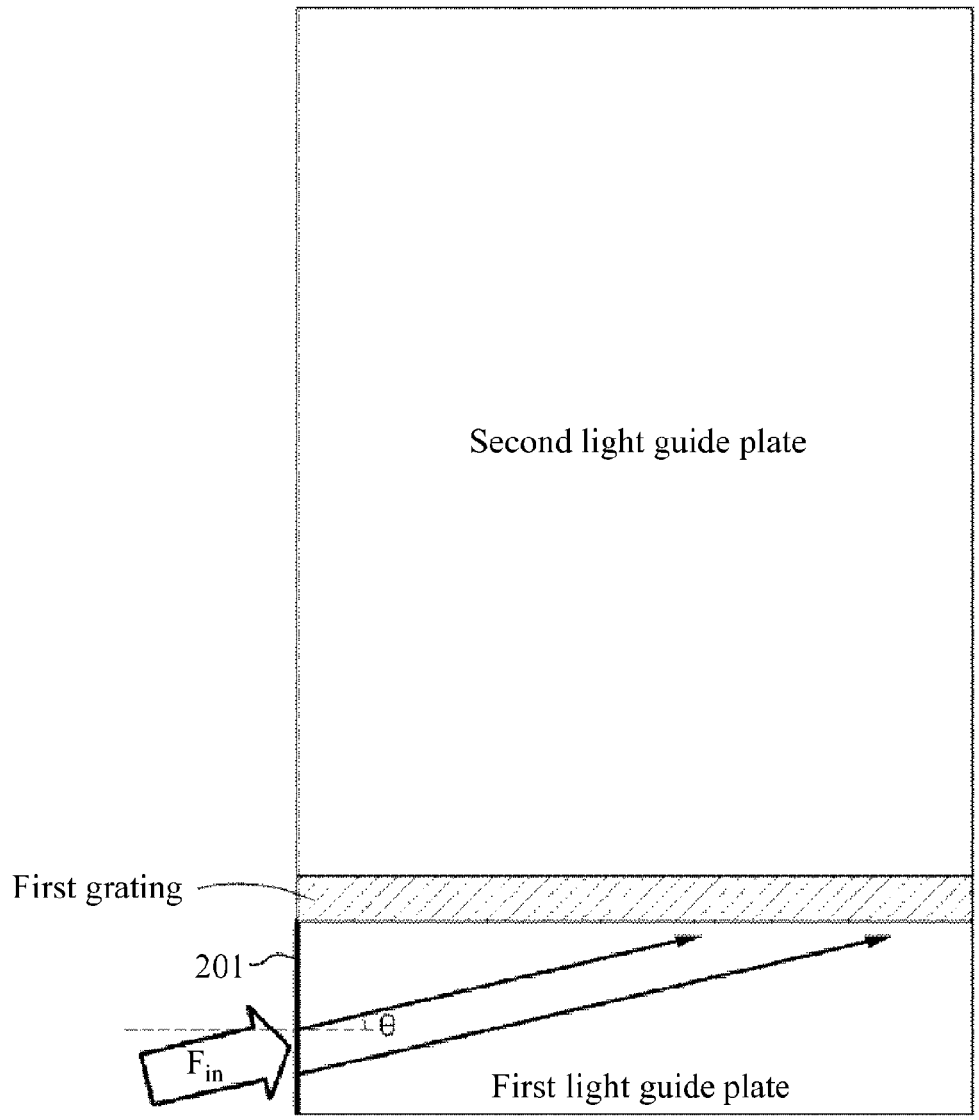

FIGS. 2A and 2B are a side view and front view of a light beam path control apparatus according to an embodiment.

Referring to FIG. 2A, the side view of the light beam path control apparatus may include cross sections of a first light guide plate, a first grating, a second light guide plate, a second grating, and a display. Hereinafter, a path of light beams output from a light source will be described based on the side view of the light beam path control apparatus.

The light beams output from the light source may be incident on the first light guide plate. Here, the output light beams may be incident in a direction substantially perpendicular to an entrance surface of the first light guide plate. Here, referring to the front view of the light beam path control apparatus illustrated in FIG. 2B, the output light beams may be incident substantially perpendicularly to the entrance surface 201 of the first light guide plate. The entrance surface 201 of the first light guide plate illustrated in FIG. 2B may correspond to the entrance surface of the first light guide plate illustrated in FIG. 2A.

An incidence angle of the light beams incident on the entrance surface may satisfy a condition that a transmittance angle is θ in consideration of a refractive index between the light guide plate and air. Here, the transmittance angle may be a condition to allow the light beams to enter the second light guide plate through the first grating 103. In more detail, the light beams may be incident on the first light beam expander and the second light beam expander in different directions.

Thus, the first light beam expander may be connected at an angle to an inside of the second light beam expander so that the light beams enter the second light beam expander. Here, a slope may be expressed as a first transmittance angle θ with respect to a first incidence angle of the light beams incident on the entrance surface of the first light guide plate constituting the first light beam expander. Here, the first incidence angle may refer to the incidence angle of the light beams incident on the first light guide plate. The first transmittance angle may refer to a transmittance angle of the light beams transmitted to the first light guide plate.

Thus, the first light beam expander and the second light beam expander may be connected at a slope of the first transmittance angle θ. The light beams output from the light source may be incident on the entrance surface of the first light guide plate at the first incidence angle to satisfy the condition of the first transmittance angle θ in consideration of a second incidence angle in the first grating for entry into the second light beam expander.

Further, the light beams output from the light source may be transmitted through the entrance surface of the first light guide plate, satisfying the condition of the first transmittance angle θ, in consideration of a relative refractive index between a refractive index of the first light guide plate and a refractive index of an air layer. The first transmittance angle may be determined based on the first incidence angle of the light beams incident on the first light guide plate, a grating direction of the first grating, and a grating period of the first grating.

The light beams incident on the first light guide plate may pass through the first light guide plate and be transmitted into the second light guide plate through the first grating. Here, the light beams transmitted through the first grating may be transmitted at a second transmittance angle with respect to a grating surface of the first grating. That is, the first grating allows the light beams, which passes through the first light guide plate using the first transmittance angle of the light beams incident on the first light guide plate as a second incidence angle, to be transmitted into the second light guide plate at the second transmittance angle.

Here, the first grating, as a diffraction grating which allows the light beams to enter the light guide plate at the first transmittance angle as described above, may be an optical component designed to control a light beam path.

The light beams transmitted through the first grating may pass through the second light guide plate to be incident on the second grating. Here, the light beams transmitted through the first grating may be incident on the second grating at an incidence angle, and the incidence angle may be determined on the second transmittance angle and a refractive index of the second light guide plate. For example, the light beams transmitted through the first grating may enter the second light guide plate to have an angle Φ with respect to one surface of the second light guide plate in contact with the second grating. Here, the angle Φ may satisfy a condition for outputting the light beams by the second grating in the direction perpendicular to the display.

The light beam path control apparatus may expand the width of the light beams for the incidence wave field with respect to the light beams. Further, the second grating, as a diffraction grating allowing the light beams to be output toward the air layer or display when the light beams passing through the second light guide plate is at an incidence angle Φ, may be an optical component designed to control a light beam path.

Here, as the display displays the light beams output from the second grating as a stereoscopic image, sizes of one surfaces of the second light guide plate and the second grating may be the same as the active area of the display.

Ultimately, through the foregoing process, the light beams output from the light beam path control apparatus may have characteristics of a plane wave field expanded corresponding to the size of the active area of the display. Also, the light beams output from the light beam path control apparatus may have a uniform light intensity.

Figure 3:
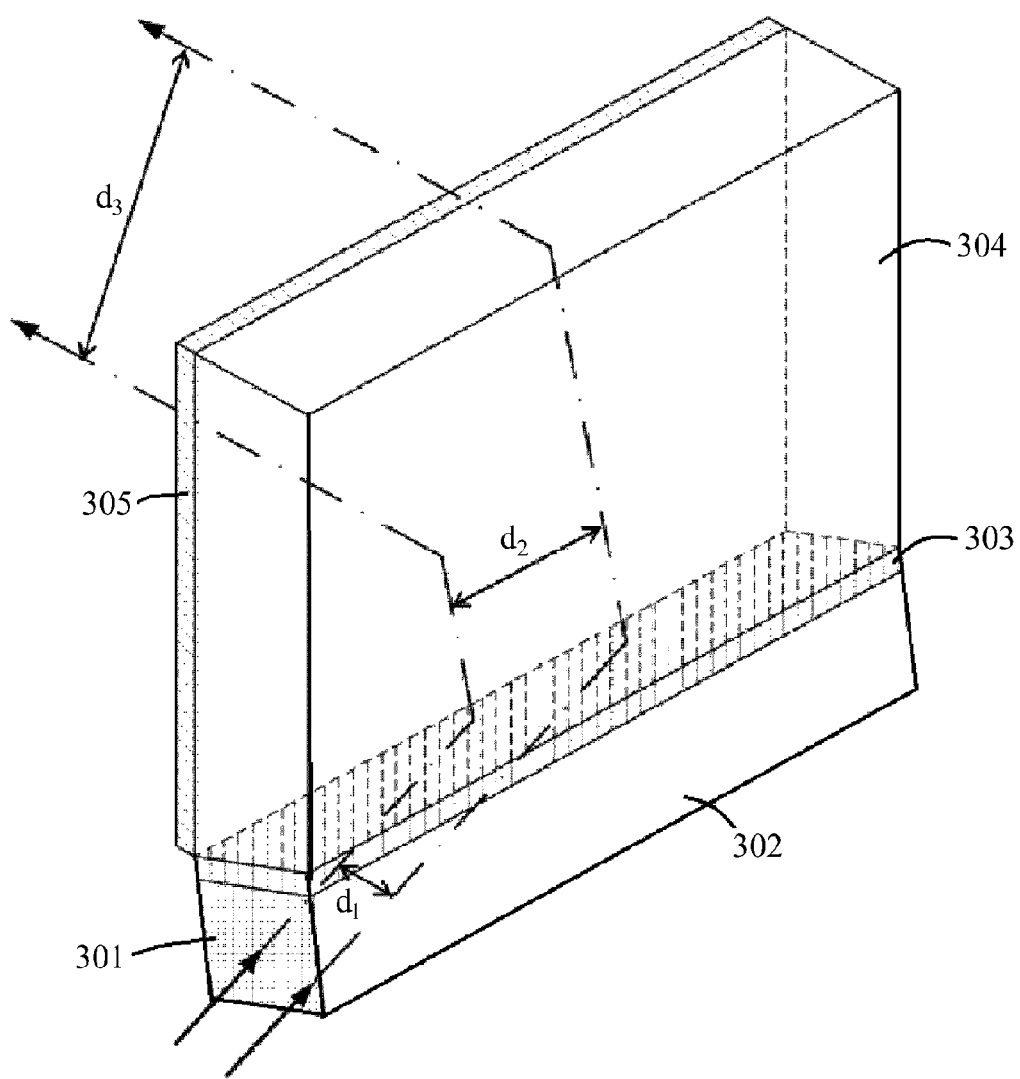
FIG. 3 illustrates a path of a light beam incident on a light beam path control apparatus according to an embodiment.

FIG. 3 illustrates a path of a light beam incident on a light beam path control apparatus according to an embodiment.

Referring to FIG. 3, in the light beam path control apparatus, light beams may be incident on an entrance surface 301 of a first light guide plate 302. Here, the incident light beams may be P-polarized to be incident on the entrance surface 301 in consideration of a surface reflectance on the entrance surface 301 of the first light guide plate 302.

Further, the incident light beams may be transmitted through the entrance surface 301 of the first light guide plate 302 at a first transmittance angle. The incident light beams may pass through the first light guide plate 302 and be transmitted into the second light guide plate 304 through the first grating. Here, the incident light beams may be transmitted into the second light guide plate having the same refractive index as a refractive index of the first light guide plate according to diffraction conditions of the first grating. The light beams passing through the second light guide plate may be incident on a second grating at an incidence angle, and the incidence angle may be determined on the transmittance angle and the refractive index of the second light guide plate.

Here, the light beams transmitted via the first grating 303 may have an expanded width $d_2$ after transmission via the first grating 303 by an incidence wave field of the light beams incident on the entrance surface 301 as compared with a width $d_1$ of the light beams before transmission through the first grating 303. That is, the light beams transmitted via the first grating 303 may pass through the second light guide plate 304 through a continuous flow of light with a different width from an incidence wave field of light beams output from a light source. Thus, the light beams passing through the second light guide plate 304 may be expanded greater than a size of a wave field incident on the entrance surface 301.

The light beams transmitted through the first grating 303 may pass through the second light guide plate and be incident on a second grating, with the width $d_2$. The light beams incident on the second grating 305 may be output in a direction perpendicular to one surface of the second grating. Here, the light beams transmitted through the second grating 305 may be output with an expanded width $d_3$ by the incidence wave field of the light beams transmitted into the second light guide plate as compared with the width $d_2$ before transmission through the second grating 305.

The light beams output through the second grating 305 may be transmitted to a display. Here, the display may be a flat holographic display which is connected in parallel with a light exit surface of the second grating 305 or is separate at a regular interval from the light exit surface of the second grating 305. The display may display, as a stereoscopic image, the light beams expanded corresponding to an active area of the display. Ultimately, the light beam path control apparatus may expand the light beams corresponding to a size of the active area of the display by using characteristics of the incidence wave field of the light beams.

Figure 4:
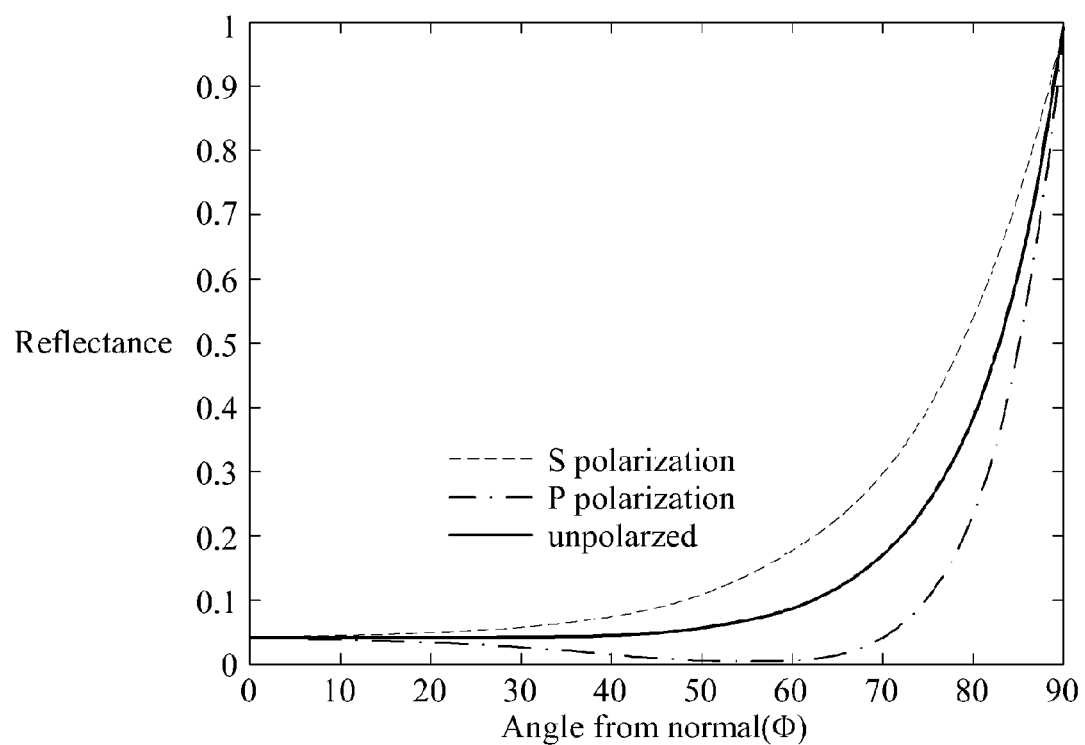
FIG. 4 is a graph illustrating a relationship between an incidence angle and a reflectance of light beams on an entrance surface of a first light guide plate according to an embodiment.

FIG. 4 is a graph illustrating a relationship between an incidence angle and a reflectance of light beams on an entrance surface of a first light guide plate according to an embodiment.

Referring to FIG. 4, light beams output from a light source may consider a refractive index $n_A$ of a first light guide plate and a refractive index $n_0$ of air of 1 when entering the first light guide plate through an entrance surface of the first light guide plate. Considering the refractive index of the first light guide plate and the refractive index of the air, a relationship between an incidence angle $\Phi$ and a transmittance angle $\theta$ of the output light beams may be represented by Equation 1.

$$\sin \Phi = n_A \sin \theta \quad \text{[Equation 1]}$$

Based on Equation 1, the light beams output from the light source may have a reflectance change as shown in FIG. 4 depending on a polarization state of the light beams on the entrance surface of the first light guide plate. Here, the polarization state is used to refer to a light beam with a uniform direction of an oscillation plane of an electric field on the entrance surface of the first light guide plate and may be broadly classified into an S-polarized state and a P-polarized state. The S-polarized state is used to refer to a waveform oscillating perpendicularly to the plane of incidence of the first light guide plate, in which selective reflection is possible. The P-polarized state is used to refer to a waveform oscillating vertically to the S-polarized state wave, in which selective transmission is possible.

The present invention may suppose that light beams are incident on the first light guide plate as a dielectric from an air layer based on a polarization state. In this case, in S-polarized and P-polarized states, the output light beams exhibit similar reflectances by the first light guide plate at an incidence angle $\Phi$ of 10 degrees or less. However, at greater than 10 degrees, the output light beams may always exhibit a lower reflectance by the first light guide plate in the P-polarized state.

That is, when the output light beams are in the P-polarized state at greater than 10 degrees, a transmittance thereof by the entrance surface of the first light guide plate is improved. Here, the transmittance may be represented by Equation 2.

$$\text{Transmittance} = 1 - \text{Reflectance} \quad \text{[Equation 2]}$$

Thus, when the incidence angle is great, the light beam path control apparatus may use P-polarized light beams in order to improve efficiency in light beam entry into the first light guide plate. In particular, when the incidence angle is about 70 to 90 degrees, the light beam path control apparatus needs to consider a separate solution for reflection suppression in order to reduce a surface reflectance. Thus, the light beam path control apparatus may design the incidence angle of the light beams incident on the first light guide plate to be within 60 degree or less considering optimal light beam entry efficiency.

Further, the light beam path control apparatus may dispose a first light beam expander and a second light beam expander to be in contact with each other in order to minimize surface reflection by a change in refractive index of light beams. That is, the light beam path control apparatus may dispose the first light beam expander and the second light beam expander to be in contact with each other according to a transmission angle of output light beams in order to minimize surface reflection by the light guide plate due to light beams entering the first light beam expander and the second light beam expander.

Further, the light beam path control apparatus may dispose the first light beam expander and the second light beam expander to be in contact with each other and allow the first light guide plate and the second light guide plate to have the same refractive index. That is, the light beam path control apparatus may use dielectrics having the same refractive index for the first light guide plate and the second light guide plate, thereby providing consistency in refractive indexes of dielectric materials. Due to consistency in refractive indexes of dielectric materials, the light beam path control apparatus may basically resolve a light loss problem, such as light leakage, which is conventionally caused by the presence of air gaps when light beams pass through an interface. Moreover, it may be minimized to conduct a precise alignment process which is additionally needed due to relocation or distorted orientation of optical components.

Figure 5:
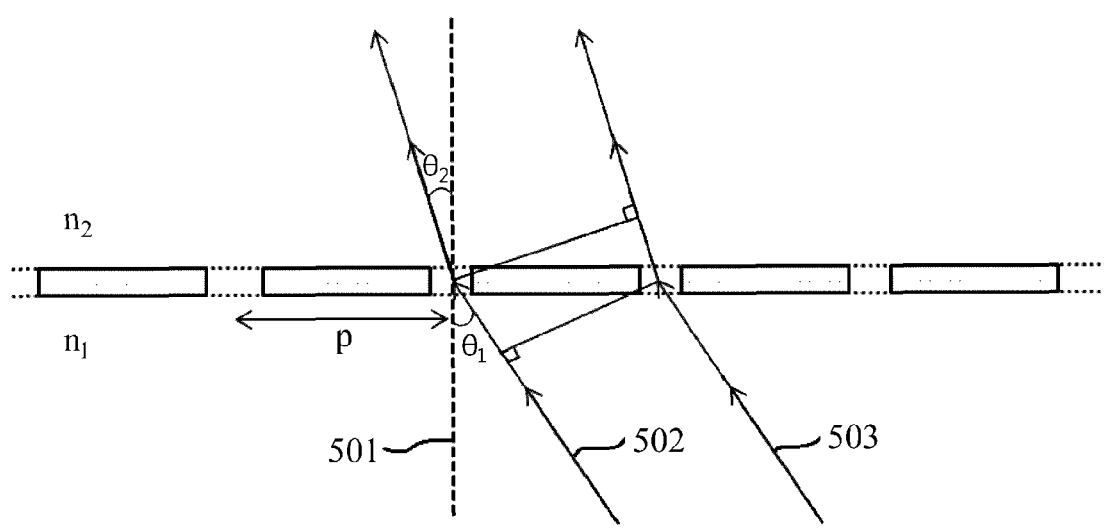
FIG. 5 is a diagram illustrating an arrangement of a transmissive diffraction grating based on a periodic alignment according to an embodiment.

FIG. 5 is a diagram illustrating an arrangement of a transmissive diffraction grating based on a periodic alignment according to an embodiment.

Referring to FIG. 5, a light beam path control apparatus may include a first grating and a second grating. Here, the first grating and the second grating may be a transmissive diffraction grating based on a periodic alignment. Hereinafter, the first grating and the second grating are collectively referred to as a transmissive diffraction grating.

Generally, a transmissive diffraction grating may be formed of a periodic alignment structure of slits or a material with a periodic refractive index change. Specifically, the transmissive diffraction grating may be formed of a grating with a pitch of P. Here, an incidence angle and a transmittance angle may be defined as $\theta_1$ and $\theta_2$ with respect to a normal 501 to the grating. Refractive indexes of lower and upper mediums of the grating may be defined $n_1$ and $n_2$, respectively. Here, as described above, the lower and upper mediums of the grating may have the same refractive index. The lower and upper mediums of the grating may correspond to the first light guide plate and the second light guide plate illustrated in the present invention.

A difference in path between a right light beam 503 and a left light beam 502 may be represented by Equation 3.

$$n_2 P \sin \theta_2 - n_1 P \sin \theta_1 \quad \text{[Equation 3]}$$

As a diffracted light beam by the grating is required to have a difference in path between light beams, determined by Equation 3, which is an integer times a wavelength, an m-th diffracted light beam may be represented by Equation 4.

$$n_2 P \sin \theta_2 - n_1 P \sin \theta_1 = m\lambda \quad \text{[Equation 4]}$$

Thus, the transmissive diffractive grating used in the present invention may be represented by Equation 5.

$$n_2 \sin\theta_2 = n_1 \sin\theta_1 + m\frac{\lambda}{P} \quad \text{[Equation 5]}$$

Figure 6:
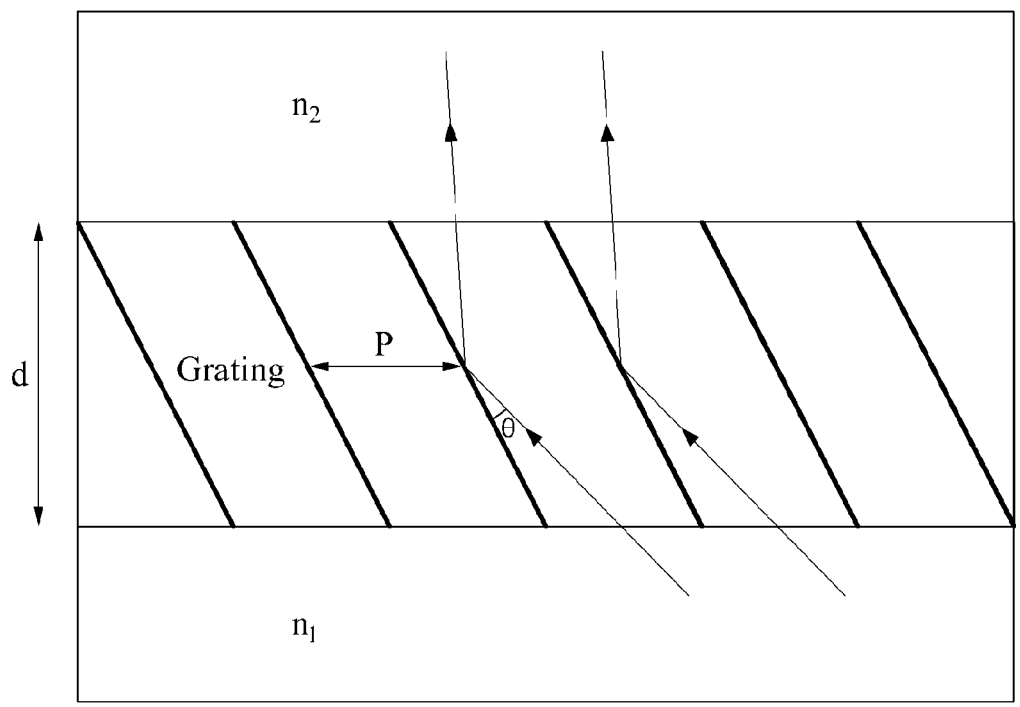
FIG. 6 is a diagram illustrating an arrangement of a transmissive grating based on a periodic refractive index change according to an embodiment.

FIG. 6 is a diagram illustrating an arrangement of a transmissive grating based on a periodic refractive index change according to an embodiment.

Referring to FIG. 6, a light beam path control apparatus may show a first grating based on a periodic refractive index change and a minimum thickness of the first grating. More specifically, the light beam path control apparatus may include the first grating and a second grating. Here, the first grating and the second grating may be a transmissive diffraction grating based on a periodic arrangement. Hereinafter, the first grating and the second grating are collectively referred to as a transmissive diffraction grating.

In the transmissive diffraction grating, an incidence angle and a transmittance angle may be defined as $\theta_1$ and $\theta_2$ with respect to a normal 501 to a surface of a grating with a pitch of P. The incidence angle $\theta_1$ and the transmittance angle $\theta_2$ may be defined as $\theta = \theta_1 = \theta_2$ according to reflection rules.

When the grating has a refractive index of n, refractive indexes of lower and upper mediums of the grating may generally be defined $n_1$ and $n_2$, respectively. Here, a traveling direction of a transmitted light beam used in the transmissive diffraction grating may be represented by Equation according to Bragg grating diffraction conditions.

$$\sin\theta = \frac{\lambda}{2P} \quad \text{[Equation 6]}$$

Based on Equation 6, the refractive indexes of the lower and upper mediums with respect to the refractive index of the grating may be assumed to be $n = n_1 = n_2$. That is, a direction of light beams transmitted in the transmissive diffraction grating may be determined on an incidence angle of the light beams, a grating direction, and a grating period.

Ultimately, the light beam path control apparatus may design the grating in consideration of the incidence angle of the light beams, the grating direction, and the grating period, thereby controlling a light beam path in a desired direction. Further, the light beam path control apparatus may design the transmissive diffraction grating to have a sufficient thickness d of about 10 μm, thereby improving diffraction efficiency of the transmitted light beams. In addition, the light beam path control apparatus may have a minimized thickness d to provide high angular selectivity. That is, the light beam path control apparatus may have excellent angular selectivity due to small angular divergence.

Thus, the light beam path control apparatus according to the present invention may be designed to use a transmissive diffraction grating based on periodic refractive index change which is capable of providing output light with high transmittance efficiency and high angular selectivity.

The apparatuses according to the embodiments of the present invention may be realized as program instructions implemented by various computers and be recorded in non-transitory computer-readable media. The media may include, alone or in combination, the program instructions, data files, data structures, and the like. The program instructions recorded in the media may be designed and configured specially for the present invention or be known and available to those skilled in computer software.

The above-described embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tapes; optical media such as CD ROMs and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An apparatus for controlling a light beam path, the apparatus comprising:
   a first light guide plate on which a light beam output from a light source is incident, the light beam being incident on an entrance surface of the first light guide plate at a first incidence angle and being transmitted at a first transmittance angle;
   a first grating configured to transmit the light beam incident on the first light guide plate into a second light guide plate, the light beam transmitted through the first grating being incident on a grating surface of the first grating at a second incidence angle corresponding to the first transmittance angle and being transmitted into the second light guide plate at a second transmittance angle;

the second light guide plate configured to pass the light beam transmitted through the first grating to be incident on a second grating, the light beam passing through the second light guide plate being determined on the second transmittance angle and a refractive index of the second light guide plate; and the second grating on which the light beam passing through the second light guide plate is incident, the light beam incident on the second grating being output in a direction perpendicular to one surface of the second grating, wherein the light beam transmitted through the first grating is transmitted into the second light guide plate having the same refractive index as a refractive index of the first light guide plate according to a diffraction condition of the first grating.

2. The apparatus of claim 1, wherein the incident light beam is P-polarized to be incident on the entrance surface in consideration of a surface reflectance on the entrance surface of the first light guide plate according to a refractive index of air.

3. The apparatus of claim 1, wherein the first transmittance angle is determined based on the first incidence angle of the light beam incident on the first light guide plate, a grating direction of the first grating, and a grating period of the first grating.

4. The apparatus of claim 1, wherein the first grating connects the first light guide plate and the second light guide plate which are combined at a slope of the first transmittance angle so that the light beam enters the second light guide plate.

5. The apparatus of claim 1, wherein the output light beam has a width expanded by an incidence wave field of the light beam incident on the entrance surface after transmitted through the first grating as compared with before transmitted through the first grating.

6. The apparatus of claim 1, wherein the transmitted light beam has a width expanded by an incidence wave field of the light beam transmitted into the second light guide plate after transmitted through the second grating as compared with before transmitted through the second grating.

7. The apparatus of claim 1, wherein the output light beam is generated by an incidence wave field having coherence and has a spatially uniform intensity.

8. The apparatus of claim 1, wherein the second grating is connected to one side of the second light guide plate in consideration of an incidence angle of the light beam passing through the second light guide plate so that the light beam exits at an angle perpendicular to a light exit surface of the second grating, the incidence angle of the light beam being determined on the second transmittance angle and the refractive index of the second light guide plate.

9. The apparatus of claim 8, wherein a display is a flat holographic display which is connected in parallel with the light exit surface of the second grating or is separate at a regular interval from the light exit surface of the second grating.

10. An apparatus for controlling a light beam path, the apparatus comprising:
a light collector configured to convert a light beam output from a light source into a parallel and straight light beam;
a first light beam expander configured to allow the light beam output from the light collector to be incident on an entrance surface of a first light guide plate and to be transmitted into a second light guide plate through a first grating according to an incidence wave field of the incident light beam, the light beam transmitted through the first grating being expanded in width by the incidence wave field and transmitted into the second light guide plate; and
a second light beam expander configured to allow the light beam transmitted through the first light beam expander to pass through the second light guide plate and to be output through a second grating in a direction perpendicular to a display according to an incidence wave field of the passing light beam, the light beam transmitted through the second grating being expanded in width by the incidence wave field and output to the display,
wherein the light beam transmitted through the first grating is transmitted into the second light guide plate having the same refractive index as a refractive index of the first light guide plate according to a diffraction condition of the first grating.

11. The apparatus of claim 10, wherein the first light beam expander comprises:
the first light guide plate on which the light beam output from the light source is incident, the light beam being incident on the entrance surface of the first light guide plate at a first incidence angle, being transmitted at a first transmittance angle, and being output in a direction perpendicular to the first grating; and
the first grating configured to transmit the light beam incident on the first light guide plate into the second light guide plate, the light beam transmitted through the first grating being incident on a grating surface of the first grating at the first incidence angle corresponding to the first transmittance angle and being transmitted into the second light guide plate at a second transmittance angle.

12. The apparatus of claim 11, wherein the incident light beam is P-polarized to be incident on the entrance surface in consideration of a surface reflectance on the entrance surface of the first light guide plate according to a refractive index of air.

13. The apparatus of claim 11, wherein the first transmittance angle is determined based on the first incidence angle of the light beam incident on the first light guide plate, a grating direction of the first grating, and a grating period of the first grating.

14. The apparatus of claim 11, wherein the first grating connects the first light guide plate and the second light guide plate which are combined at a slope of the transmittance angle in consideration of a relative refractive index between the first light guide plate and air so that the light beam enters the second light guide plate.

15. The apparatus of claim 10, wherein the second light beam expander comprises:
the second light guide plate configured to pass the light beam transmitted through the first grating to be incident on a second grating, the light beam passing through the second light guide plate being determined on the second transmittance angle and a refractive index of the second light guide plate; and
the second grating on which the light beam passing through the second light guide plate is incident, the light beam incident on the second grating being output in a direction perpendicular to one surface of the second grating.

16. The apparatus of claim 15, wherein the transmitted light beam has a width expanded by an incidence wave field of the light beam transmitted into the second light guide plate after transmitted through the second grating as compared with before transmitted through the second grating.

17. The apparatus of claim 15, wherein the output light beam is generated by an incidence wave field having coherence and has a spatially uniform intensity.

18. The apparatus of claim 15, wherein the second grating is connected to one side of the second light guide plate in consideration of an incidence angle of the light beam passing through the second light guide plate so that the light beam exits at an angle perpendicular to a light exit surface of the second grating.

* * * * *